(12) United States Patent
Holdsworth et al.

(10) Patent No.: US 7,240,097 B2
(45) Date of Patent: Jul. 3, 2007

(54) METHOD AND SYSTEM FOR PRESERVING MESSAGE ORDER WHEN PARALLEL PROCESSING MESSAGES

(75) Inventors: Simon A J Holdsworth, Andover (GB); Peter R MacFarlane, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 10/085,300

(22) Filed: Feb. 28, 2002

(65) Prior Publication Data

US 2003/0110230 A1    Jun. 12, 2003

(30) Foreign Application Priority Data

Dec. 12, 2001    (GB) .................................. 0129672.2

(51) Int. Cl.
*G06F 15/16*    (2006.01)
(52) U.S. Cl. ...................................... 709/207; 709/205
(58) Field of Classification Search ................ 709/207, 709/231, 205; 375/363, 240.01
See application file for complete search history.

(56) References Cited

U.S. PATENT DOCUMENTS

| | | | |
|---|---|---|---|
| 5,796,633 A * | 8/1998 | Burgess et al. ............. | 702/187 |
| 5,887,134 A * | 3/1999 | Ebrahim ...................... | 709/200 |
| 5,905,724 A * | 5/1999 | Carson et al. ............... | 370/385 |
| 6,055,413 A * | 4/2000 | Morse et al. ............... | 340/7.43 |
| 6,366,950 B1 * | 4/2002 | Scheussler et al. ......... | 709/206 |
| 6,430,602 B1 * | 8/2002 | Kay et al. .................... | 709/206 |
| 6,728,779 B1 * | 4/2004 | Griffin et al. ............... | 709/239 |
| 6,839,748 B1 * | 1/2005 | Allavarpu et al. .......... | 709/223 |
| 6,842,773 B1 * | 1/2005 | Ralston et al. .............. | 709/206 |

* cited by examiner

*Primary Examiner*—Ario Etienne
*Assistant Examiner*—El Hadji Sall
(74) *Attorney, Agent, or Firm*—Jerry W. Herndon, Esq.; Steven M. Greenberg, Esq.; Carey Rodriguez Greenberg & Paul LLP

(57) ABSTRACT

A method and system for preserving message order when parallel processing messages by: providing a marker (H) in each message (M) for identifying a source of messages for which it is required to preserve the message order; and dispatching (D) each message in accordance with its marker to one of a plurality of parallel processors (P1–P3) so that processing is preserved for messages processed through the plurality of parallel processors. The dispatcher (D) retains a list of all markers of messages that are being processed in parallel, and when a message becomes available to the dispatcher for processing, the dispatcher inspects the list of messages that are currently being processed to determine whether the marker of this message is in the list, and if so delays initiating parallel processing for this message until the marker is no longer in the list. This technique allows a stream of messages originating from multiple sources to be processed with the advantages of parallel processing, while preserving the order of a subset of these messages.

15 Claims, 2 Drawing Sheets

METHOD AND SYSTEM FOR PRESERVING MESSAGE ORDER WHEN PARALLEL PROCESSING MESSAGES

FIELD OF THE INVENTION

This invention relates to processing of messages in a computer system.

BACKGROUND OF THE INVENTION

In the field of this invention it is known that for optimum performance of message throughput when processing messages in a computer system, there is a requirement to take advantage (if possible) of parallel processing facilities of the system on which the processing takes place, for example employing multiple parallel threads in a process where each thread processes a separate message.

It is known that an input node of a computer program or data processing system which is receiving messages may be configured to process messages containing the same userid in sequence. In this case messages containing different userids may overtake each other, but messages with the same userid will not. Such message processing works acceptably where the message is processed by a single message "broker" (which provides routing/formatting services) and is then sent to a client application.

However, in the situation where the message is passed from one broker to another in a broker network before it reaches a client, this approach is not suitable because all messages arriving at an input node of a second broker have the same userid (the userid of the previous broker to process a message), and the same is true at subsequent brokers, so the userid is not an adequate parameter for preserving message ordering.

A need therefore exists to preserve message order when parallel processing messages wherein the abovementioned disadvantage may be alleviated.

SUMMARY OF THE INVENTION

In accordance with a first aspect of the present invention there is provided a method for preserving message order when parallel processing messages, comprising: receiving messages each including a marker for identifying a message source; responsive to receipt of a message, using the marker to identify the source of the message and determining whether it is required to preserve the message order; and dispatching each message in accordance with its marker to one of a plurality of parallel processing threads such that processing order is preserved when required for messages processed through the plurality of parallel processing threads.

In accordance with a second aspect of the present invention there is provided a system for preserving message order when parallel processing messages, comprising: means for receiving messages; means, responsive to a marker within a received message, for identifying a source of the message and determining whether it is required to preserve the message order; and a dispatcher for dispatching each message in accordance with its marker to one of a plurality of parallel processing threads such that processing order is preserved when required for messages processed through the plurality of parallel processing threads.

BRIEF DESCRIPTION OF THE DRAWINGS

A preferred system and method for preserving message order when parallel processing messages and incorporating the present invention will now be described, by way of example only, with reference to the accompanying drawings, in which.

DESCRIPTION OF PREFERRED EMBODIMENT

In a preferred embodiment of the invention, messages for which it is required to preserve the order of processing hold a marker to indicate that ordering is required. Further, the marker indicates the unique source of ordered messages such that, if messages from different sources are processed by a single message processing program (such as within a message brokering program), it is possible for the processor of the messages to determine whether processing of each message may be undertaken in parallel with messages already being processed without the possibility of the order of ordered messages being lost.

Figure 1:
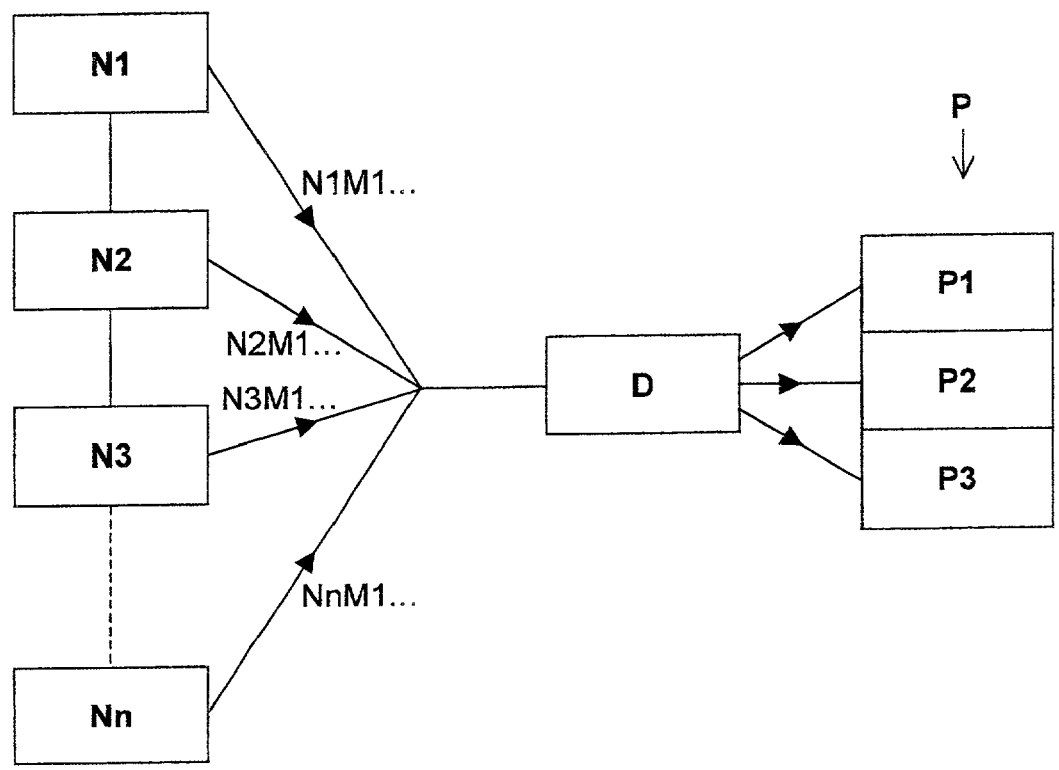
FIG. 1 shows a block-schematic diagram of computer system incorporating the present invention.

Referring now to FIG. 1, a computer system has a series of nodes N1, N2, N3 . . . Nn, each of which produces a sequence of messages M1, M2, M3 . . . Mm (the contents of which will be described in more detail below), resulting in a possible stream of messages (first to last): N1M1, N2M1, N2M2, N2M3, N3M1, N4M1, N1M2, N2M4, N3M2, N4M2, N4M3, N2M5.

The resulting message stream is passed to a dispatcher D, which (as will be explained in greater detail below) dispatches selected messages in the message stream to different ones of parallel processing elements P1, P2 and P3, which together form a processor P. It will be understood that although the processor P is represented as a number of discrete parallel processors P1, P2 and P3, in practice the parallel processors need not be separate hardware processors and may be provided by respective threads of multi-threading software on a single hardware processor system. In the context of the present application, a 'parallel processor' or 'parallel processing thread' should be interpreted as optionally comprising a thread of a multi-threading computer program or a processor of a multi-processor system.

The system of FIG. 1 finds particular application in a message delivery system (not shown) in which messages may be delivered through a network of servers including one or more "brokers" which provide routing and formatting services. The brokers are located at communication hubs within the network. In such a network the nodes N1, N2, N3 . . . Nn, may be respective input nodes of a message broker in a sequence of message brokers, the input nodes N1, N2, N3 . . . Nn, receiving messages processed by brokers (not shown) earlier in the sequence.

IBM Corporation's MQSeries and WebSphere MQ family of messaging products are examples of known products which support interoperation between application programs running on different systems in a distributed heterogeneous environment. Message queuing and commercially available message queuing products are described in "Messaging and Queuing Using the MQI", B. Blakeley, H. Harris & R. Lewis, McGraw-Hill, 1994, and in the following publications which are available from IBM Corporation: "An Introduction to Messaging and Queuing" (IBM Document number GC33-0805-00) and "MQSeries—Message Queue Interface Technical Reference" (IBM Document number SC33-0850-01). The network via which the computers communicate using message queuing may be the Internet, an intranet, or any computer network. IBM, WebSphere and MQSeries are trademarks of IBM Corporation.

The message queuing inter-program communication support provided by the MQSeries products enables each application program to send messages to the input queue of any other target application program and each target application can asynchronously take these messages from its input queue for processing. This achieves delivery of messages between application programs which may be spread across a distributed heterogeneous computer network, without requiring a dedicated logical end-to-end connection between the application programs, but there can be great complexity in the map of possible interconnections between the application programs.

This complexity can be greatly simplified by including within the network architecture a communications hub to which other systems connect, instead of having direct connections between all systems. Message brokering capabilities can then be provided at the communications hub to provide intelligent message routing and integration of applications. Message brokering functions typically include the ability to route messages intelligently according to business rules and knowledge of different application programs' information requirements, using message 'topic' information contained in message headers, and the ability to transform message formats using knowledge of the message format requirements of target applications or systems to reconcile differences between systems and applications.

Such brokering capabilities are provided, for example, by IBM Corporation's MQSeries Integrator (MQSI) and Web-Sphere MQ Integrator products, providing intelligent routing and transformation services for messages which are exchanged between application programs using IBM's MQSeries and WebSphere MQ messaging products.

The system of FIG. 1 can be used, for example, in an implementation where the processing nodes are MQSI Brokers, and the inter-broker communication employs MQ message queues, where the input node of each flow within the broker has an ordered attribute. If multiple input nodes or multiple flows produce messages that are merged into a single flow of messages, and some of these originate from nodes that require ordering to be preserved, the flow of messages may be sent between adjacent brokers.

Now, hypothetically for this example, if messages produced at odd nodes (N1, N3 etc) are to be treated as ordered, and at even nodes (N2, N4 etc) treated as unordered, then the example stream may be received and processed taking advantage of parallel processing for each message up to receipt of N1M2. When this message is encountered it must not be processed in parallel with N1M1, or ordering may be lost. Thus new threads may be dispatched as each message is received until a message is encountered which must preserve relative ordering with a message already being processed. When this condition occurs, processing of the first message must complete before the second can begin.

Figure 2:
FIG. 2 shows a schematic representation of a message used in the computer system of FIG. 1.
Figure 2:

Referring now to FIG. 2, in an example of inter-broker message flows, each message M would contain a marker H (typically within a message header, which is combined with message content C) which is used to identify each unique source of messages for which it is required to preserve the message order. The marker would correspond to (or be derived from) a zero value if no ordering of the message is necessary, and a non-zero value if ordering is required. The non-zero value would be derived in such a way that it would be likely to be unique amongst a group of message sources.

The dispatcher D, which initiates parallel processing of the messages, retains a list of all markers of messages that are being processed in parallel. When a message becomes available to the dispatcher D for processing, the dispatcher inspects the list of messages that are currently being processed to determine whether the marker of this message is in the list. If the marker is found in the list, the dispatcher D does not initiate parallel processing for this message until the marker is no longer in the list.

In this way, the dispatching algorithm used by the receiving inter-broker node would simply dispatch new threads, up to a configured limit, until a message was received that contained a marker that matched the marker of a message currently being processed. At this time the dispatcher D would wait for processing of this message to complete before processing further messages.

Referring to FIG. 2, the marker H used in the ordered message may be constructed as a hash-code derived from unique characteristics of the source of the ordered messages where these characteristics may be unique to the sequence of ordered messages. For example, characteristics may include a combination of the originating userid of the messages, the queue on which messages are put; an identifier associated with the input node; and an identifier associated with the mode of processing, etc. If two (or more) sources of messages happened to generate the same marker, the ordering of messages from the sources would still be preserved—the only adverse effect would be that unnecessary serialization of messages would occur when parallel processing theoretically would be possible.

For example, the marker H may be a hash value formed from the message's originating userid and a zero/non-zero value as follows:

At input node N1, operating in a mode that requires processing of all messages sequentially (using a single thread)

message N1M1: userid 'fred', value 234325;

message N1M2: userid 'bill', value 534345;

message N1M3: userid 'fred', value 234325.

At input node N2, operating in a mode that requires processing of messages on multiple threads message N2M1: userid 'bill', value 0;

message N2M2: userid 'fred', value 0.

In the example given above, when the messages N1M1, N1M2, N1M3, N2M1 & N2M2 arrive at the dispatcher D, the dispatcher can tell that it can process messages N1M1, N1M2, N2M1 & N2M2 in parallel, but it must wait until message N1M1 has finished processing before message N1M3 can be processed.

It will be appreciated that the hash value is a compact representation of the data which only needs a simple comparison to determine whether serialization is required. It will also be appreciated that the userid per se of the message originator does not need to be disclosed to other brokers or subscribers; the hash value is sent, analysed on receipt and used to ensure serialization as necessary of a subset of messages.

It will be understood that by delaying initiating parallel processing of the new message until the marker is no longer in the list, as described above, the invention may delay initiating parallel processing of any message awaiting dispatch until the marker of the next message on the input stream is no longer in the list. Clearly, this could be inefficient.

A possible enhancement to avoid this inefficiency would be for the dispatcher to maintain an ordered queue for each marker that is in its list of messages being processed. When message processing by a parallel processing element completes for a specific marker, the dispatcher then assigns to this processing element the next message in the ordered queue for this specific marker. If the queue for a specific marker is empty, the dispatcher then selects the next message in its input stream of messages awaiting dispatch: if this message has a marker in the list then the message is added to the ordered queue for this marker, if not then the message is assigned to a processing element and its marker added to the list.

The advantage of this enhancement would be that it enables the parallel processing capacity to always be fully exploited when further unordered (or first in a new order) messages are available to process.

It will be appreciated that the method described above for preserving message order when parallel processing messages in a computer system will typically be carried out by software running on a data processing system (not shown), and that the software may be provided as a computer program element carried on any suitable data carrier (also not shown) such as a machine-readable magnetic or optical recording medium.

It will be understood that the method and system described above allows a stream of messages originating from multiple sources to be processed with the advantages of parallel processing, while preserving the order of a subset of these messages.

What is claimed is:

1. A method for preserving message order when parallel processing messages, comprising:

receiving messages each including a marker for identifying a message source;

responsive to receipt of a message, using the marker to identify the source of the message and determining whether it is required to preserve the message order; and dispatching each message in accordance with its marker to one of a plurality of parallel processing threads such that processing order is preserved when required for messages processed through the plurality of parallel processing threads, wherein a predetermined value of the marker indicates that ordering is not required; and retaining a list of all markers of messages that are being processed in parallel; determining whether the marker of a new message is present in the list; and delaying initiating parallel processing of the new message until the marker is no longer in the list.

2. The method of claim 1 further comprising maintaining an ordered queue for each marker that is in the list of messages being processed, and, when message processing by one of the plurality of parallel processing threads completes for a marker, dispatching to said one of the plurality of parallel processing threads the next message in the ordered queue for said marker.

3. The method of claim 1 wherein the marker is derived from characteristics of the source of the ordered messages.

4. The method of claim 3 wherein the characteristics include at least one of:

an identifier of the user originating the message;

an identifier of a repository on which message is put;

an identifier associated with a respective input node receiving the message; and an identifier associated with the mode of processing.

5. The method of claim 4 wherein the characteristics include:

an identifier of the user originating the message;

an identifier associated with a respective input node receiving the message; and an identifier associated with the mode of processing.

6. The method of claim 4 wherein the characteristics include:

an identifier of the user originating the message;

an identifier of a repository on which message is put; and an identifier associated with the mode of processing.

7. The method of claim 1 wherein the marker comprises a hash code.

8. A system for preserving message order when parallel processing messages, comprising:

means for receiving messages;

means, responsive to a marker within a received message, for identifying a source of the message and determining whether it is required to preserve the message order; and a dispatcher for dispatching each message in accordance with its marker to one of a plurality of parallel processing threads such that processing order is preserved when required for messages processed through the plurality of parallel processing threads, wherein a predetermined value of the marker indicates that ordering is not required; and means for accessing a list of all markers of messages that are being processed in parallel; means for determining whether the marker of a new message is present in the list; and means for delaying initiating parallel processing of the new message until the marker is no longer in the list.

9. The system of claim 8, further comprising an ordered queue for each marker that is in the list of messages being processed, and the dispatcher comprises means for, when message processing by one of the plurality of parallel processing threads completes for a marker, dispatching to said one of the plurality of parallel processing threads the next message in the ordered queue for said marker.

10. The system of claim 8 wherein the marker is derived from characteristics of the source of the ordered messages.

11. The system of claim 10 wherein the characteristics include at least one of:

an identifier of the user from whom the message originates;

an identifier of a respective input node receiving the message;

an identifier of a repository on which message is put; and an identifier associated with the mode of processing.

12. The system of claim 11 wherein the characteristics include:

an identifier of the user from whom the message originates;

an identifier of a respective input node receiving the message; and an identifier associated with the mode of processing.

13. The system of claim 11 wherein the characteristics include:
- an identifier of the user from whom the message originates;
- an identifier of a repository on which message is put; and
- an identifier associated with the mode of processing.

14. The system of claim 8 wherein the marker comprises a hash code.

15. A computer program product comprising program code recorded on a machine readable recording medium, for controlling the operation of a data processing system on which the program code executes, to perform the method of claim 1.

* * * * *